United States Patent
Thimbleby

(10) Patent No.: US 11,275,517 B2
(45) Date of Patent: Mar. 15, 2022

(54) REDUCING METADATA FOR DATA STRUCTURES

(71) Applicant: Apple Inc., Cupertino, CA (US)

(72) Inventor: William J. Thimbleby, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 16/673,836

(22) Filed: Nov. 4, 2019

(65) Prior Publication Data

US 2021/0109665 A1 Apr. 15, 2021

Related U.S. Application Data

(60) Provisional application No. 62/806,633, filed on Feb. 15, 2019.

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01)

(58) Field of Classification Search
CPC ....... G06F 3/0631; G06F 3/0604; G06F 3/067
See application file for complete search history.

(56) References Cited

U.S. PATENT DOCUMENTS 9,568,943 B1 * 2/2017 Carman ................. G06F 3/065
2016/0357720 A1 * 12/2016 Thimbleby ........... G06F 3/0484

* cited by examiner

*Primary Examiner* — Craig S Goldschmidt
(74) *Attorney, Agent, or Firm* — Morgan, Lewis & Bockius LLP

(57) ABSTRACT

A device implementing a system for reducing an amount of metadata stored with respect to updates to data includes a processor configured to receive a first sequence of identifiers comprising identifiers which are unique with respect to each other and which represent first updates to data, and a second sequence of identifiers comprising identifiers which are unique with respect to each other and which represent second updates to the data, the first and second updates to the data being independent of one another. The processor is further configured to generate a third sequence of identifiers comprising identifiers which are unique with respect to each other and with respect to the identifiers in at least one of the first or second sequences of identifiers, the third sequence of identifiers representing a combination of the first and second sequences of identifiers, and to provide for storage of the third sequence of identifiers.

20 Claims, 7 Drawing Sheets

REDUCING METADATA FOR DATA STRUCTURES

CROSS-REFERENCE TO RELATED APPLICATIONS

The present application claims the benefit of U.S. Provisional Patent Application Ser. No. 62/806,633, entitled "Reducing Metadata for Data Structures," filed Feb. 15, 2019, which is hereby incorporated herein by reference in its entirety for all purposes.

TECHNICAL FIELD

The present description relates generally to managing data structures, including reducing metadata overhead when replicating data structures.

BACKGROUND

Concurrent updates to data may be effected by the use replicated data structures, such as conflict-free replicated data types (CRDTs). Replicated data structures may be associated with metadata to ensure consistency between different instances of the data structure.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
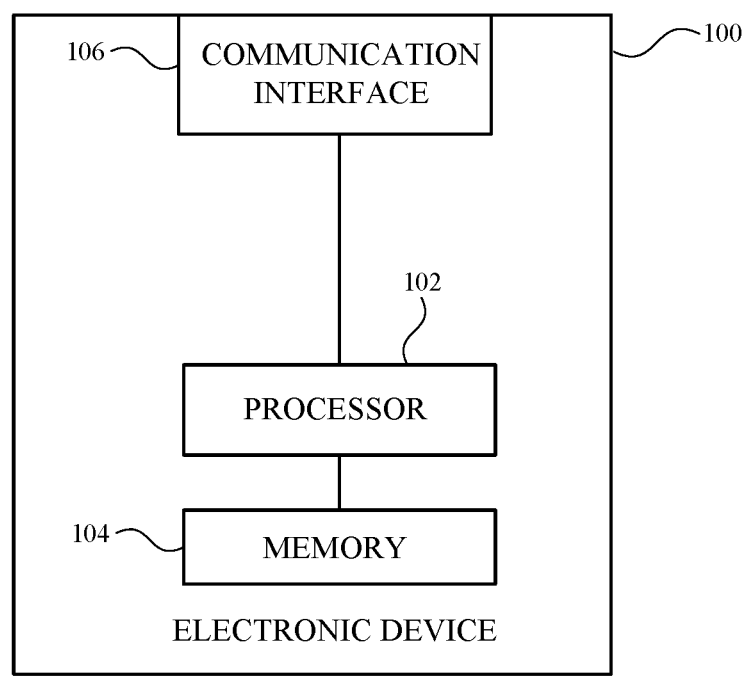
FIG. 1 illustrates an example electronic device that may implement a system for reducing metadata for replicated data structures in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, concurrent updates to data may be effected by the use of replicated data structures such as CRDTs. For example, the data can correspond to a list or a memo (e.g., a grocery list, a home improvement list, a note which is not in list form, a contacts list, an events list, or the like) generated by an application (e.g., a notetaking application, a personal information manager application and/or another application for managing data).

A CRDT is a data structure which represents updates to data and which can be replicated, such that the replicas can be updated independently and concurrently without coordination between the replicas. For example, CRDTs may be used in distributed computing, where the data structure is replicated across multiple devices in a network. Alternatively or in addition, it may also be desirable to replicate a data structure across multiple threads of a same process.

However, replicating the data structure across multiple threads may lead to increased use of metadata. In this regard, a copy of a CRDT may have an amount of metadata associated therewith (e.g., identifiers, timestamps/counters associated with the updates, or the like). As multiple copies of a CRDT are generated, the amount of metadata may accumulate. As such, it may be desirable to reduce metadata overhead associated with the use of CRDTs. The subject system provides for replicating data structures across multiple threads of a same process while providing for reduced metadata overhead.

In the subject system, each data structure may include a sequence of identifiers that represents updates to data (e.g., where a character of text in a memo or list is represented by a respective identifier, or where an item in the memo or list is represented by a respective identifier). The sequences of identifiers across the multiple threads of the process may each have unique identifiers, and may be combined into a new sequence of unique identifiers. For example, the new sequence of identifiers may be generated by merging the unique identifiers from the multiple threads, and renaming the identifiers (e.g., based off of a global identifier value). Thus, the sequence of identifiers containing the renamed identifiers may be used to represent all of the updates to the data across the multiple threads. In this manner, the metadata associated with storing multiple copies of the respective data structures across the multiple threads may be compressed, thereby reducing the amount of metadata required to store the updates.

In addition, the subject system may provide for an index set of values for one or more of the sequences of identifiers, for example, by performing run length encoding on the sequence(s) of identifiers. The index set of values provides for specifying ranges of identifiers (e.g., corresponding to a range of identifiers that has been accounted for or "seen"), rather than a single integer value for an identifier (e.g., corresponding to a last seen value, but without necessarily indicating range information). Thus, the index set of values may provide for identifying gaps (e.g., missing data) for identifiers in a particular sequence of identifiers. In merging individual sequences of identifiers to generate a renamed sequence of unique identifiers, it is possible for the renamed sequence of identifiers to be contiguous (e.g., where a seen-up-to range is represented by a single integer as opposed to multiple integers), thereby further reducing metadata overhead while still accounting for gaps.

FIG. 1 illustrates an example electronic device that may implement a system for reducing metadata for replicated data structures in accordance with one or more implementations. Not all of the depicted components may be used in all implementations, however, and one or more implementations may include additional or different components than those shown in FIG. 1. Variations in the arrangement and type of the components may be made without departing from the spirit or scope of the claims as set forth herein. Additional components, different components, or fewer components may be provided.

The electronic device 100 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios.

The electronic device 100 may include a processor 102, a memory 104, and a communication interface 106. The processor 102 may include suitable logic, circuitry, and/or code that enable processing data and/or controlling operations of the electronic device 100. In this regard, the processor 102 may be enabled to provide control signals to various other components of the electronic device 100. The processor 102 may also control transfers of data between various portions of the electronic device 100. Additionally, the processor 102 may enable implementation of an operating system or otherwise execute code to manage operations of the electronic device 100.

The memory 104 may include suitable logic, circuitry, and/or code that enable storage of various types of information such as received data, generated data, code, and/or configuration information. The memory 104 may include, for example, random access memory (RAM), read-only memory (ROM), flash, and/or magnetic storage.

In one or more implementations, the memory 104 may store content (e.g., list(s) or memo(s) such as a grocery list, a home improvement list, a reminder note which is not in list form, a contacts list, an events list) that are generated by one or more applications (e.g., a notetaking application, a personal information manager application and/or another application for managing data).

The memory 104 may further store data structures (e.g., CRDTs) with sequences of identifiers corresponding to updates to the content. Using the list example, each character of the list may be represented by an identifier within a sequence of identifiers. Thus, the memory 104 may store multiple sequences of identifiers (e.g., corresponding to multiple threads of a process making updates to the content), as well as global context data for coordinating the renaming and/or merging of the multiple sequences of identifiers into a combined sequence of identifiers. The combined sequence of identifiers may represent a summation of the updates to the content across the multiple threads of the process.

The communication interface 106 may include suitable logic, circuitry, and/or code that enables wired or wireless communication, such as between other electronic devices and/or a server over a network (not shown). The communication interface 106 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 102, the memory 104, the communication interface 106, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 2:
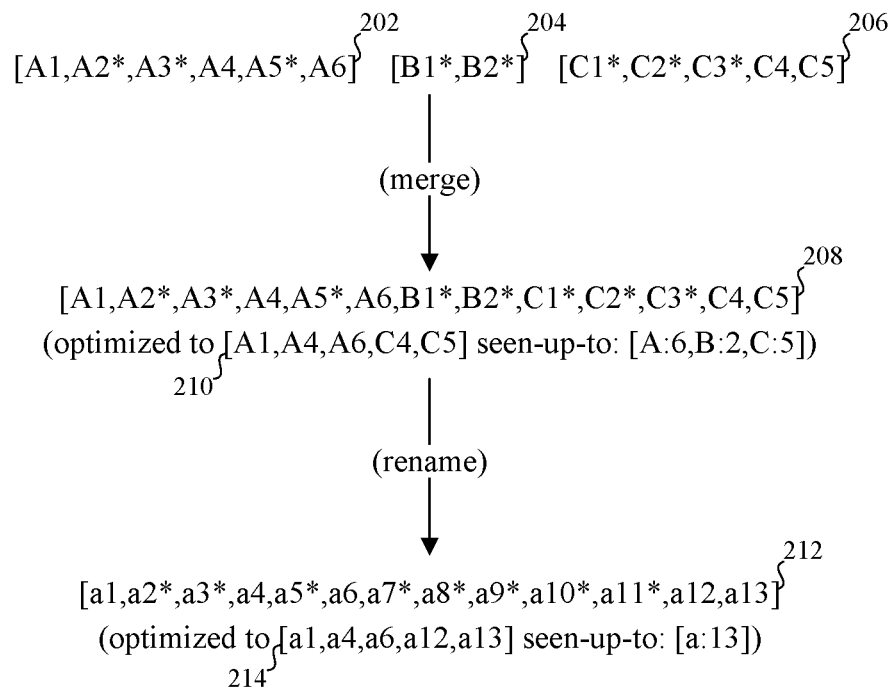
FIG. 2 illustrates an example of merging and renaming sequences of identifiers corresponding to replicated data structures in accordance with one or more implementations.

FIG. 2 illustrates an example of merging and renaming sequences of identifiers corresponding to replicated data structures in accordance with one or more implementations. As noted above, the subject system may provide for replicating data structures across multiple threads of a process running on the electronic device 100.

In the example of FIG. 2, each of the sequence of identifiers 202, the sequence of identifiers 204 and the sequence of identifiers 206 (hereinafter sequences of identifiers 202-206) may correspond to a separate thread of a process. The process may correspond to an application(s) (e.g., a notetaking application, a personal information manager application and/or another application for managing data) running on the electronic device 100.

The sequences of identifiers 202-206 may correspond to updates made to data associated with the application(s) (e.g., lists or memos such as a grocery list, a home improvement list, a note, a contacts list, an events list, or the like). As content is updated (e.g., character(s) are inserted and/or deleted), corresponding identifier(s) are also updated (e.g., as insertions for added characters and/or as "tombstones," described below, for deleted characters). Compression of these insertions and/or tombstones may lead to reduced metadata overhead, particularly when using sequences of identifiers across multiple threads of a process.

In the example of FIG. 2, each of the sequences of identifiers 202-206 may be represented as an observed-remove set. For an observed-remove set, each insertion (e.g., of an identifier corresponding to a data update) is unique, and removing an item from the set removes the effect of all the insertions of that item that can be observed at the time of the removal. On removal, an insertion may be referred to as "tomb stoned," in which the insertion is flagged (e.g., with the "*" symbol) as no longer having an effect. Every insertion is assigned a unique identifier. In one or more implementations, the identifiers 202-206 are globally unique (e.g., with respect to the process, for example, across the sequences of identifiers 202-206 and 212) and monotonic. The identifiers may be monotonic in that they increment sequentially based off of a local monotonic counter (e.g., such that the identifiers correspond to timestamps). For example, to generate identifiers, the monotonic counter may increment for every new identifier.

Thus, in the example of FIG. 2, the sequence of identifiers 202 indicates insertions for identifiers A1-A6, where the insertions for A2, A3 and A5 were removed (e.g., as indicated by the "*" which corresponds to a tombstone). The sequence of identifiers 204 indicates insertions for identifiers B1 and B2 (e.g., both tombstoned), and the sequence of identifiers 206 indicates insertions for C1-C5 with C1-C3 being removed (e.g., tombstoned).

As shown in FIG. 2, the sequences of identifiers 202-206 may be merged into a sequence of identifiers 208, which includes the unique identifiers from each of the sequences of identifiers 202-206. In one or more implementations, the sequence of identifiers 208 may be represented as an optimized observed-remove set 210. In an optimized observed-remove set, sequential unique identities are generated for each insertion. This allows for metadata to be compressed, since the existence of tombstones can be inferred.

Thus, instead of flagging tombstoned entries (e.g., with an "*"), an optimized observed-remove set lists insertion entries which have not been removed and further indicates a seen-up-to value. Tombstoned entries can be inferred based on this format. In the example of FIG. 2, the sequence of identifiers 208 ([A1,A2*,A3*,A4,A5*,A6, B1*,B2*, C1*,C2*,C3*,C4,C5]) can be compressed to the optimized observed-remove set 210 ([A1,A4,A6,C4,C5] seen-up-to: [A:6, B:2, C:5]), where the tombstoned entries of A2*,A3*, A5*,B1*,B2*,C1*,C2* and C3* can be inferred. In this regard, the optimized observed-remove set 210 may include adjacent identifiers that are non-consecutive. For example, identifiers A1 and A4 may be considered as non-consecutive and identifiers A4 and A6 may be considered as non-consecutive, while identifiers C4 and C5 may be considered as consecutive.

The subject system further provides for renaming the sequence of identifiers 208 (which as noted above includes the unique identifiers from each of the sequences of identifiers 202-206) into a renamed sequence of identifiers 212. In one or more implementations, the renamed sequence of identifiers 212 are globally unique (e.g., unique across the sequences of identifiers 202-206) and monotonic (e.g., based off of a local monotonic counter corresponding to a timestamp).

Moreover, the renamed sequence of identifiers 212 represents a combination of the sequences of identifiers 202-206. In the example of FIG. 2, the renamed sequence of identifiers 212 may be based off of a shared global identifier that corresponds to the data structure (e.g., CRDT) being updated across multiple replicas. Thus, in the example of FIG. 2, the renamed sequence of identifiers 212 includes identifiers a1-a13, where: the sequence of identifiers 202 (A1-A6) map to a1-a6, the sequence of identifiers 204 (B1-B2) map to a7-a8, and the sequence of identifiers 206 (C1-C5) map to a9-a13. Alternatively, instead of renaming the identifiers as "a1-a13," it is possible to rename the identifiers as "A1-A13," such that B1-B2 and C1-C5 are renamed to A7-A8 and A9-A13, respectively, and A1-A6 are not renamed. In one or more implementations, this mapping may be stored (e.g., temporarily stored). For example, the stored mapping may be used to account for update(s) in the sequences of identifiers 202-206.

In one of more implementations, the renamed sequence of identifiers 212 can be compressed and/or otherwise represented as the optimized observed-remove set 214 ([a1,a4, a6,a12,a13] seen-up-to: [a:13]), where the tombstoned entries (e.g., a2,a3,a5,a7,a8,a9,a10 and a11) can be inferred.

Thus, given the individual threads of a process which make updates to data (e.g., a list, a memo or the like) and which have unique sequences of identifiers (e.g., the sequences of identifiers 202-206), the electronic device 100 may take the unique sequences of identifiers and collapse them down to a single sequence, while storing the mapping of the renamed identifiers.

As noted above, the global identifier may correspond to the data structure (e.g., CRDT) being replicated and updated across multiple threads. Thus, different identifiers may be used for different data structures being replicated/updated. Using the notes application as one example, separate notes (e.g., a grocery list note, a home improvement list note) may be assigned different identifiers (e.g., different global identifiers). In this way, sequences of identifiers in separate threads that modify the grocery list may be renamed based on a first identifier (e.g., a global identifier, such as global identifier "a"+monotonic counter value), and sequences of identifiers in other threads that modify the home improvement list may be renamed based on a second identifier (e.g., a global identifier, such global identifier "b"+monotonic counter value). In one or more implementations, the generation and coordination of the global identifiers may be stored as part of global context data used for management of the multiple sequences of identifiers. As discussed further below, the global context data may further include maximum value(s) for the individual sequences of identifiers.

In one or more implementations, the electronic device 100 may provide for storage of the optimized observed-remove set 214. Different events may trigger providing the optimized observed-remove set 214 for storage, including but not limited to saving a corresponding data model and/or sending the underlying data updates to another device. Providing for storage of the optimized observed-remove set 214 may include storing the optimized observed-remove set 214 in non-volatile memory of the electronic device 100. Alternatively or in addition, providing for storage of the optimized observed-remove set 214 may include sending the optimized observed-remove set 214 to another device/service for storage.

Figure 3:
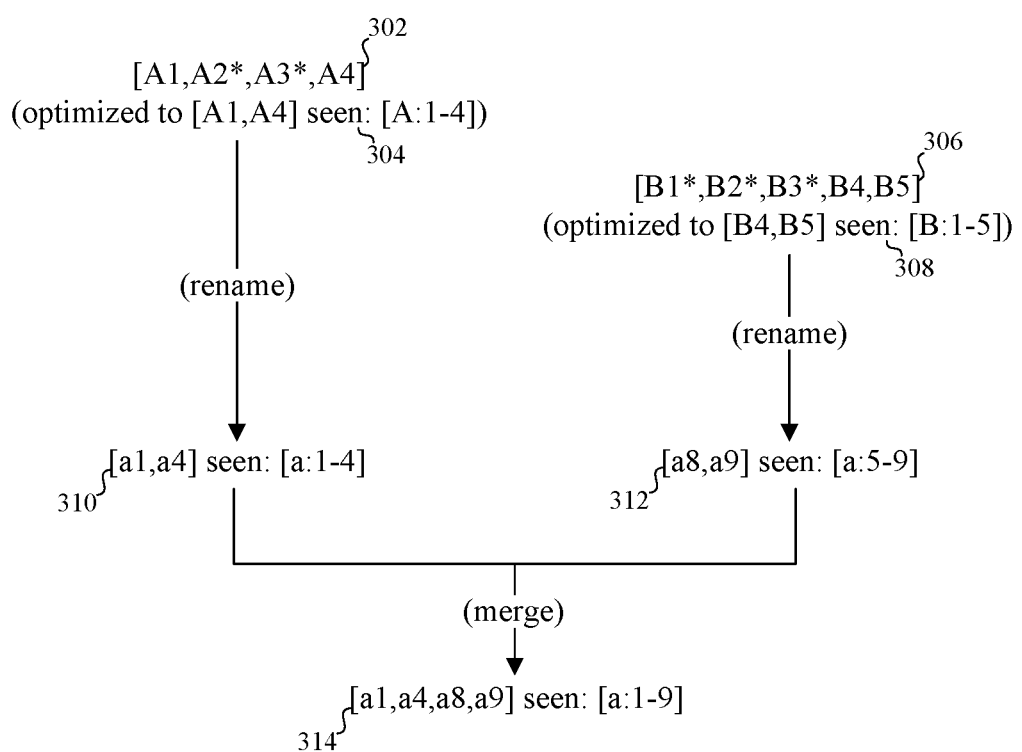
FIG. 3 illustrates an example of using index set values in conjunction with renaming sequence identifiers in accordance with one or more implementations.

FIG. 3 illustrates an example of using index set values in conjunction with renaming sequence identifiers in accordance with one or more implementations. In the example of FIG. 3, two sequences of identifiers are generated and finalized independently and then merged into a combined sequence of identifiers.

For example, the sequence of identifiers 302 (an observed-remove set) may be represented as the sequence of identifiers 304 (an optimized observed remove set). Prior to merging, the sequence of identifiers 304 can be renamed to a renamed sequence of identifiers 310, where the range 1-4 in the "seen [a:1-4]" indicates that all values from a1-a4 have been seen (e.g., that all values a1-a4 have at one point been accounted for by a thread).

Further, the sequence of identifiers 306 (an observed-remove set) may be implemented as the sequence of identifiers 308 (an optimized observed-remove set). Prior to merging, the sequence of identifiers 308 can be renamed to a renamed sequence of identifiers 312. In this case, the "seen [a:5-9]" represents an index set of values (e.g., the range of values 5-9). In the example of FIG. 3, the index set of values represents that identifiers a5-a9 have been seen, but values for a0-a4 have not been seen for the respective thread.

In one or more implementations, the index set of values may be run length encoded. For example, run length encoding for the index set of values may represent runs of consecutive "seen" values as an integer, followed by runs of consecutive "missing" values stored as an integer, followed by runs of consecutive "seen" values stored as a single integer, and so on, for all the identifiers in the sequence. In an example separate from that in FIG. 3, an index set of values 5, 1, 2 would indicate that 5 values were seen, followed by 1 value that was not seen, followed by 2 values that were seen.

Following the renaming, the sequence of identifiers 310 and the sequence of identifiers 312 may be merged into a merged sequence of identifiers 314. As shown in the example of FIG. 3, the use of an index set of values for the sequence of identifiers 312 may create overhead as a temporary state (e.g., based on the index set of values [a:5-9]), but when the two sequences of identifiers 310-312 are merged together, the result is a fully contiguous sequence [a1,a4,a8,a9] seen: [a:5-9], where the range 1-9 indicates that there are no gaps (e.g., based on run length encoding).

Thus, in merging sequences of identifiers (e.g., which may include gaps) to generate a combined sequence of unique identifiers, it is possible for the combined sequence of identifiers to be contiguous, thereby further reducing metadata overhead while still accounting for missing data.

Figure 4:
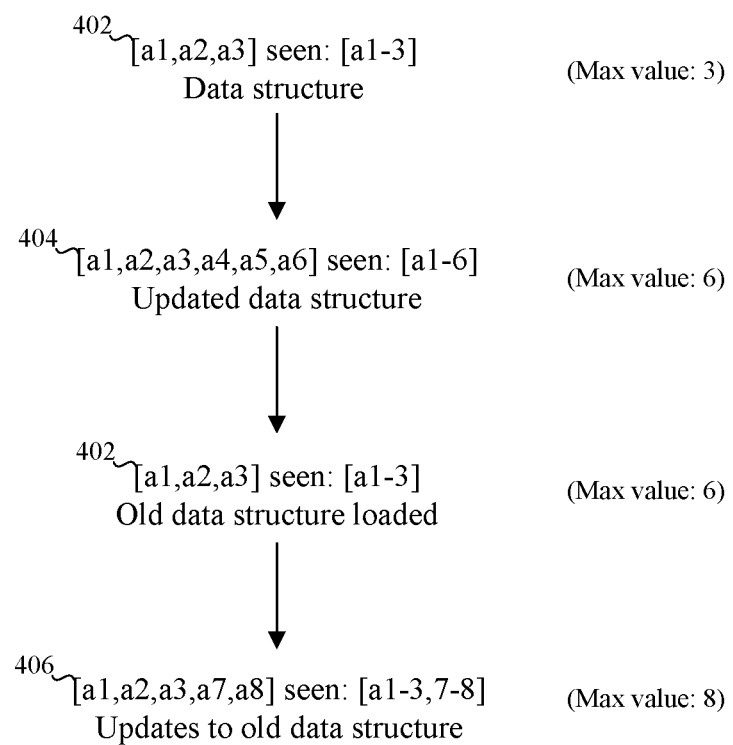
FIG. 4 illustrates an example of storing a maximum value for a sequence of identifiers in accordance with one or more implementations.

FIG. 4 illustrates an example of storing a maximum value for a sequence of identifiers in accordance with one or more implementations. In some instances, it is possible for an application (e.g., notetaking application, a personal information manager application) to erroneously load an old version of a replicated data structure. In such cases, storing a maximum value may be beneficial to avoid conflicts in updates made to a data structure (e.g., a CRDT).

In the example of FIG. 4, a sequence of identifiers 402 corresponding to a data structure may be updated and saved as the sequence of identifiers 404. However, it is possible for the application to load the sequence of identifiers 402 corresponding to the old data structure (e.g., an out-of-date and/or previous data structure), for example, as part of a faulty launch and/or because the old data structure is all that is available. When generating more identifiers for the sequence of identifiers 402, new identifiers a4 and a5 may be generated, based on an incorrect assumption to start incrementing from a3. This may create two copies of the same data structure having conflicting changes for the identifiers a4 and a5.

Thus, in one or more implementations, a maximum value for a given sequence of identifiers can be maintained and stored as part of the above-noted global context data. While the sequence of identifiers 402 may initially have a maximum value of 3 (e.g., corresponding to the last update of a3), the maximum value is updated (e.g., and stored) to 6 to reflect the updates for the sequence of identifiers 404. In a case where the old sequence of identifiers 402 is loaded, the maximum value of 6 would lead to new identifiers a7 and a8 to be generated for the sequence of identifiers 406, which would not conflict with the changes for the identifiers a4 and a5. The maximum value may be stored prior to combining (e.g., prior to merging and/or renaming) sequences of identifiers. Moreover, the above-described index set of values (e.g., based on run-length encoding) may be used to allow for gaps in sequences.

In one or more implementations, to avoid storing a maximum value per sequence for an indefinite time period, it is possible to store a maximum value for the sum of all sequences, or to start a new sequence. In other words, an individual maximum value can be discarded after some predefined time interval. If the individual maximum values are needed again, the individual maximum values may either start from an index guaranteed to be greater than their previous values (e.g., but which may leave gaps in the run length encoding), or a new sequence of identifiers can be generated.

Figure 5:
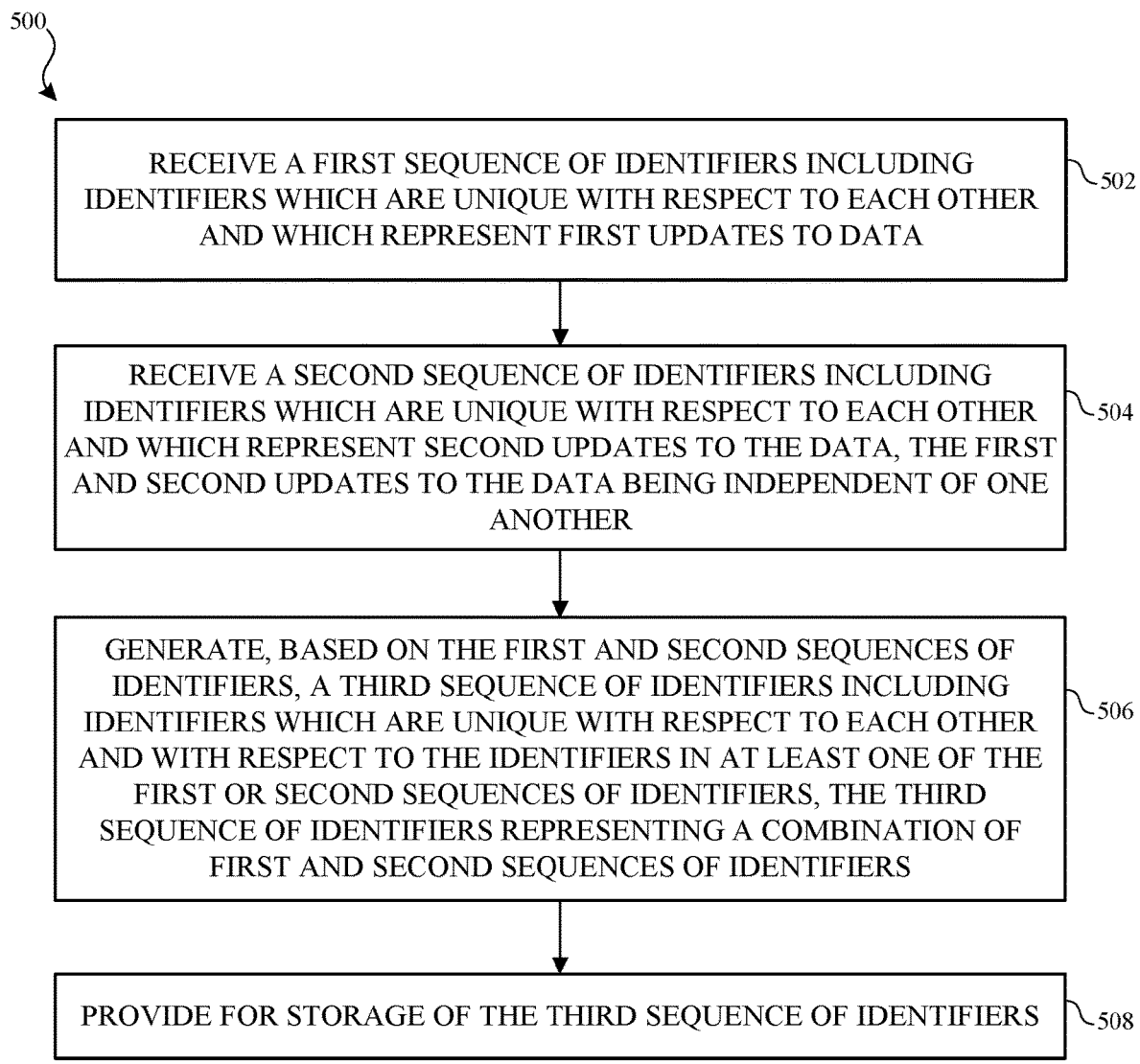
FIG. 5 illustrates a flow diagram of an example process for reducing an amount of metadata stored with respect to updates to data in accordance with one or more implementations.

FIG. 5 illustrates a flow diagram of an example process for reducing an amount of metadata stored with respect to updates to data in accordance with one or more implementations. For explanatory purposes, the process 500 is primarily described herein with reference to the electronic device 100 of FIG. 1. However, the process 500 is not limited to the electronic device 100 of FIG. 1, and one or more blocks (or operations) of the process 500 may be performed by one or more other components of the electronic device 100 and/or other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The electronic device 100 receives a first sequence of identifiers including identifiers which are unique with respect to each other and which represent first updates to data (502). The data may correspond to content generated and stored by an application (e.g., notes, lists, memos and the like). For example, a character of text in a memo or list may be represented by a respective identifier and/or an item in the memo or list may be represented by a respective identifier.

The electronic device 100 receives a second sequence of identifiers including identifiers which are unique with respect to each other and which represent second updates to the data, the first and second updates to the data being independent of one another (504). At least one of the first sequence of identifiers or the second sequence of identifiers may include adjacent identifiers that are non-consecutive. Each of the first and second sequences of identifiers may be implemented as part of respective conflict-free replicated data types (CRDTs).

Each of the first and second updates may be generated by a separate thread of a process or copy of the process. The separate threads may execute on a single computing device (e.g., the electronic device 100).

The electronic device 100 generates, based on the first and second sequences of identifiers, a third sequence of identifiers including identifiers which are unique with respect to each other and with respect to the identifiers in at least one of the first or second sequences of identifiers (506). The third sequence of identifiers represents a combination of the first and second sequences of identifiers.

For example, the third sequence of identifiers may represent third updates to the data corresponding to a sum of the first and second updates to the data. The generating may include merging the first sequence of identifiers and the second sequence of identifiers into a merged sequence of identifiers, and renaming at least one of the identifiers in the merged sequence of identifiers to generate the third sequence of identifiers.

The identifiers in each of the first, second and third sequences of identifiers may be monotonic with respect to each other. The identifiers in the first, second and third sequences of identifiers may further be globally unique with respect to each other.

The electronic device 100 may generate a mapping of the first and second sequences of identifiers to the third sequence of identifiers, and use the mapping to update the third sequence of identifiers (e.g., to account for an update in at least one of the first and second sequences of identifiers).

The electronic device 100 provides for storage of the third sequence of identifiers (508). For a subsequent instantiation of the application, the electronic device 100 may retrieve the third sequence of identifiers from storage, and may use the third sequence of identifiers to represent the third updates to the data.

Providing for storage of the third sequence of identifiers may include storing the third sequence of identifiers in non-volatile memory. Alternatively or in addition, providing for storage of the third sequence of identifiers may include sending the third sequence of identifiers to another device remote from the electronic device 100 (e.g., a storage service).

The electronic device 100 may maintain a maximum value for identifiers for at least one of the first or second sequences of identifiers as identifiers are added. The maximum value may be used to determine a starting value for identifiers when loading an old version of at least one of the first or second sequences of identifiers. The electronic device 100 may store the maximum value prior to the generating.

Figure 6:
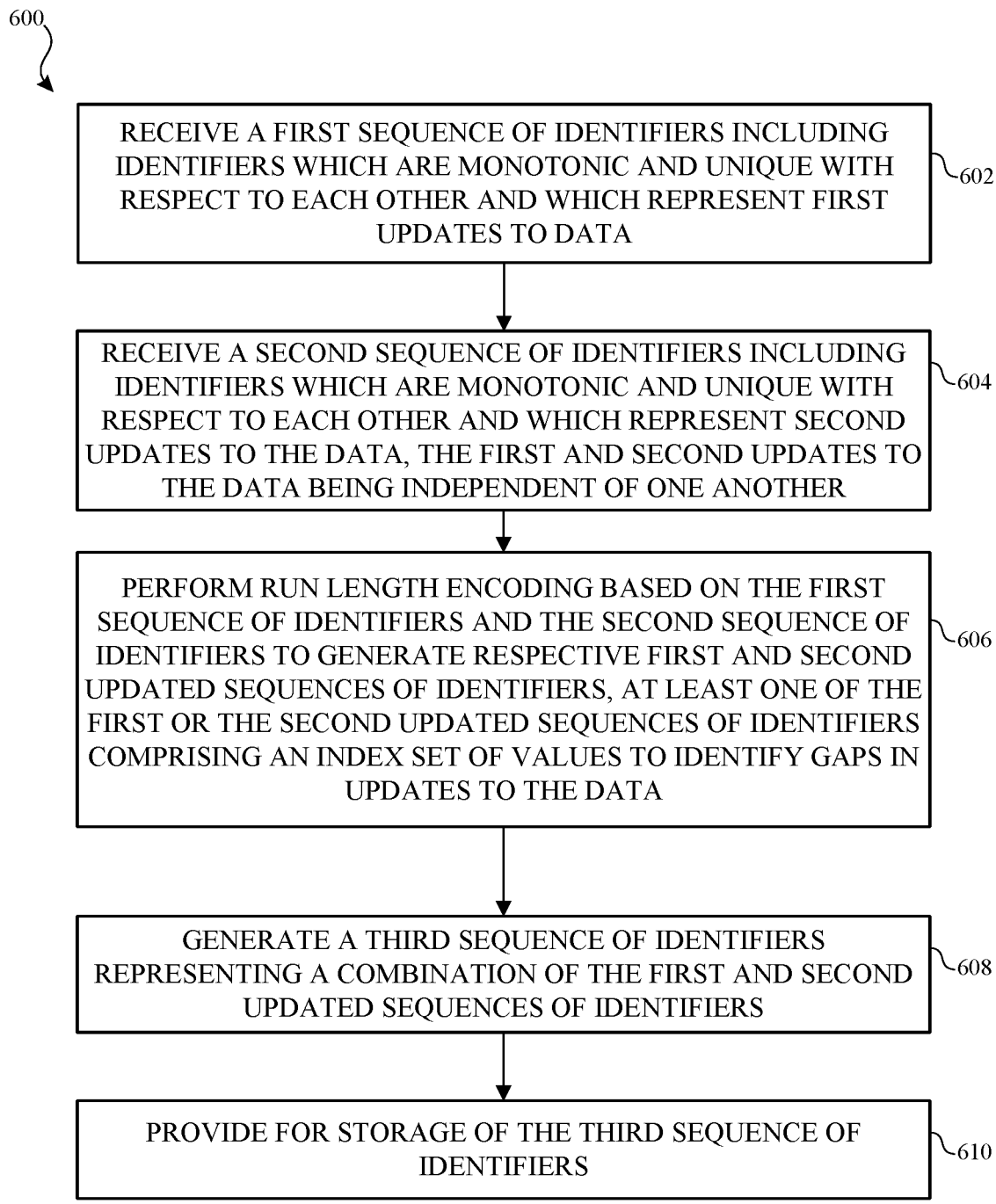
FIG. 6 illustrates a flow diagram of another example process for reducing metadata for replicated data structures in accordance with one or more implementations.

FIG. 6 illustrates a flow diagram of another example process for reducing metadata for replicated data structures in accordance with one or more implementations. For explanatory purposes, the process 600 is primarily described herein with reference to the electronic device 100 of FIG. 1. However, the process 600 is not limited to the electronic device 100 of FIG. 1, and one or more blocks (or operations) of the process 600 may be performed by one or more other components of the electronic device 100 and/or other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 100 receives a first sequence of identifiers including identifiers which are monotonic and unique with respect to each other and which represent first updates to data (602). The data may correspond to content generated and stored by an application (e.g., notes, lists, memos and the like).

The electronic device 100 receives a second sequence of identifiers including identifiers which are monotonic and unique with respect to each other and which represent second updates to the data, the first and second updates to the data being independent of one another (604).

The electronic device 100 performs run length encoding based on the first sequence of identifiers and the second sequence of identifiers to generate respective first and second updated sequences of identifiers (606). At least one of the first or the second updated sequences of identifiers includes an index set of values to identify gaps between identifiers.

The electronic device 100 generates a third sequence of identifiers representing a combination of first and second updated sequences of identifiers (608). The third sequence of identifiers includes identifiers which are monotonic and unique with respect to each other. The third sequence of identifiers may be contiguous.

The electronic device 100 provides for storage of the third sequence of identifiers (610). Providing for storage of the third sequence of identifiers may include storing a representation of the third sequence of identifiers in non-volatile memory. Alternatively or in addition, providing for storage of the third sequence of identifiers may include sending the representation of the third sequence of identifiers to a storage service (e.g., that is remote from the electronic device 100).

Figure 7:
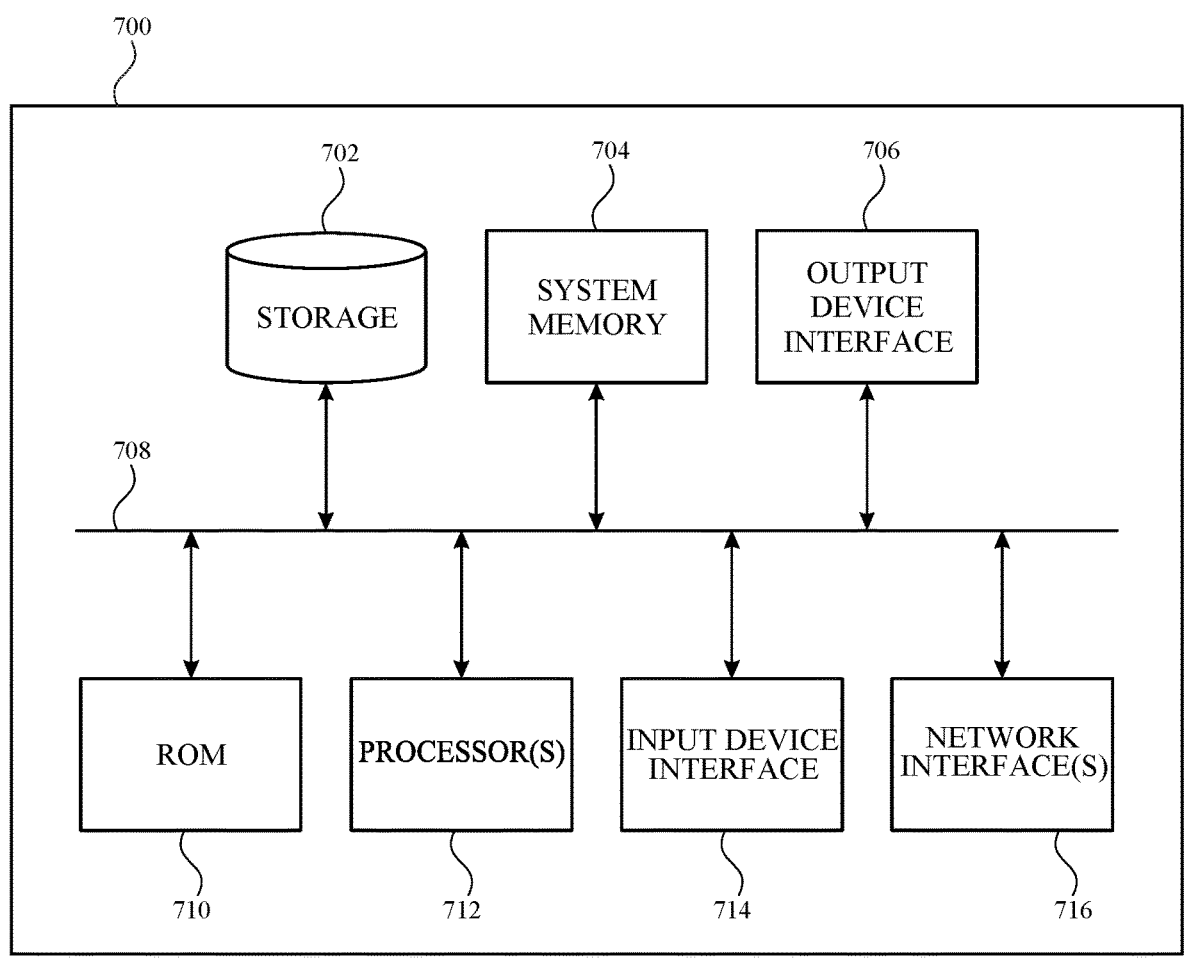
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, the electronic device 100 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as a server, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for reducing an amount of metadata stored with respect to updates to data, comprising:
   receiving a first sequence of identifiers comprising identifiers which are unique with respect to each other and which represent first updates to data;
   receiving a second sequence of identifiers comprising identifiers which are unique with respect to each other and which represent second updates to the data, the first and second updates to the data being independent of one another;
   generating, based on the first and second sequences of identifiers, a third sequence of identifiers comprising identifiers which are unique with respect to each other and with respect to the identifiers in at least one of the first or second sequences of identifiers, the third sequence of identifiers representing a combination of the first and second sequences of identifiers; and
   providing for storage of the third sequence of identifiers, wherein the identifiers in the first, second and third sequences of identifiers are globally unique with respect to the other identifiers in all of the first, second and third sequences.

2. The method of claim 1, wherein the identifiers in each of the first, second and third sequences of identifiers are monotonic with respect to the other identifiers in that sequence.

3. The method of claim 1, wherein the first, second, and third sequences of identifiers are metadata for the data and are stored in addition to the data, and wherein generating the third sequence of identifiers reduces the amount of the metadata stored with respect to the updates to the data.

4. The method of claim 1, wherein the data corresponds to content generated and stored by an application.

5. The method of claim 4, wherein the first and second updates to the data correspond to updates to the content generated and stored by the application, and
   wherein the third sequence of identifiers represents third updates to the data corresponding to a sum of the first and second updates to the data.

6. The method of claim 5, further comprising:
   retrieving the third sequence of identifiers from storage; and
   using the third sequence of identifiers to represent the third updates to the data for a subsequent instantiation of the application.

7. The method of claim 1, wherein the generating comprises:
   merging the first sequence of identifiers and the second sequence of identifiers into a merged sequence of identifiers; and
   renaming at least one of the identifiers in the merged sequence of identifiers to generate the third sequence of identifiers.

8. The method of claim 1, wherein providing for storage of the third sequence of identifiers comprises storing the third sequence of identifiers in non-volatile memory.

9. The method of claim 1, wherein providing for storage of the third sequence of identifiers comprises sending the third sequence of identifiers to a storage service.

10. The method of claim 1, wherein each of the first and second updates is generated by a separate thread of a process or copy of the process.

11. The method of claim 10, wherein the separate threads execute on a single computing device.

12. The method of claim 1, wherein the first sequence of identifiers and the second sequence of identifiers only include adjacent identifiers that are consecutive, and wherein the third sequence of identifiers representing the combination of the first and second sequences of identifiers includes two or more adjacent identifiers that are non-consecutive.

13. The method of claim 1, further comprising:
   generating a mapping of the first and second sequences of identifiers to the third sequence of identifiers; and
   using the mapping to update the third sequence of identifiers to account for an update in at least one of the first and second sequences of identifiers.

14. The method of claim 1, further comprising:
   maintaining a maximum value for identifiers for at least one of the first or second sequences of identifiers as identifiers are added, wherein the maximum value is used to determine a starting value for new identifiers when loading an old version of at least one of the first or second sequences of identifiers.

15. The method of claim 14, further comprising:
   storing the maximum value prior to the generating.

16. The method of claim 1, wherein each of the first and second sequences of identifiers are implemented as metadata for respective conflict-free replicated data types (CRDTs) corresponding to the data.

17. A device, comprising:
   at least one processor; and
   a memory including instructions for reducing an amount of metadata stored with respect to updates to data that, when executed by the at least one processor, cause the at least one processor to:

receive a first sequence of identifiers comprising identifiers which are monotonic and unique with respect to each other and which represent first updates to data;

receive a second sequence of identifiers comprising identifiers which are monotonic and unique with respect to each other and which represent second updates to the data, the first and second updates to the data being independent of one another;

perform run length encoding based on the first sequence of identifiers and the second sequence of identifiers to generate respective first and second updated sequences of identifiers, at least one of the first or the second updated sequences of identifiers comprising an index set of values to identify gaps between identifiers;

generating a third sequence of identifiers representing a combination of the first and second updated sequences of identifiers; and provide for storage of the third sequence of identifiers, wherein the identifiers in the first, second and third sequences of identifiers are globally unique with respect to the other identifiers in all of the first, second and third sequences.

18. The device of claim 17, wherein the third sequence of identifiers is contiguous.

19. The device of claim 17, wherein the data corresponds to content generated and stored by an application.

20. A computer program product comprising code, stored in a non-transitory computer-readable storage medium, the code comprising:

code to receive a first sequence of identifiers comprising identifiers which are unique with respect to each other and which represent first updates to data, the data corresponding to content generated and stored by an application;

code to receive a second sequence of identifiers comprising identifiers which are unique with respect to each other and which represent second updates to the data, the first and second updates to the data being independent of one another;

code to generate, based on the first and second sequences of identifiers, a third sequence of identifiers comprising identifiers which are unique with respect to each other and with respect to the identifiers in at least one of the first or second sequences of identifiers, the third sequence of identifiers representing a combination of the first and second sequences of identifiers; and code to provide for storage of the third sequence of identifiers, wherein the identifiers in the first, second and third sequences of identifiers are globally unique with respect to the other identifiers in all of the first, second and third sequences.

* * * * *